United States Patent
Hein et al.

(10) Patent No.: US 7,153,372 B2
(45) Date of Patent: Dec. 26, 2006

(54) METHOD FOR REMOVING PARTICLES FROM ELEMENTS INSTALLED IN A VACUUM CHAMBER

(75) Inventors: Stefan Hein, Blankenbach (DE); Günter Klemm, Nidda (DE)

(73) Assignee: Applied Materials GmbH & Co. KG., Alzenau (DE)

( * ) Notice: Subject to any disclaimer, the term of this patent is extended or adjusted under 35 U.S.C. 154(b) by 0 days.

(21) Appl. No.: 11/050,233

(22) Filed: Feb. 3, 2005

(65) Prior Publication Data

US 2005/0211273 A1    Sep. 29, 2005

(30) Foreign Application Priority Data

Mar. 26, 2004   (EP)   ................................. 04007325

(51) Int. Cl.
    *B08B 5/04*   (2006.01)
(52) U.S. Cl. .............................. 134/21; 134/30; 134/37
(58) Field of Classification Search ................. 134/21, 134/30, 37, 18
    See application file for complete search history.

(56) References Cited

U.S. PATENT DOCUMENTS

| 3,666,049 | A | * | 5/1972 | Kern et al. ................... 26/104 |
| 5,328,555 | A | * | 7/1994 | Gupta ......................... 134/1.2 |
| 2003/0046968 | A1 | | 3/2003 | Potthoff |
| 2005/0082000 | A1* | | 4/2005 | Moriya et al. ......... 156/345.28 |
| 2005/0211821 | A1* | | 9/2005 | Hein et al. ............... 242/615.2 |

FOREIGN PATENT DOCUMENTS

| DE | 88 13 091 U | 12/1988 |
| DE | 37 33 448 A | 3/1989 |
| DE | 39 19 425 A | 12/1990 |
| EP | 0-470 332 A | 2/1992 |

* cited by examiner

Primary Examiner—Zeinab El-Arini
(74) Attorney, Agent, or Firm—Fulbright & Jaworski L.L.P.

(57) ABSTRACT

Gas is introduced prior to a flooding process of a vacuum chamber of a vacuum installation, into coverings of elements, which coverings can be ventilated such that solid bodies are blown out of said coverings thereby preventing a penetration of said solid bodies into the coverings.

13 Claims, 2 Drawing Sheets

METHOD FOR REMOVING PARTICLES FROM ELEMENTS INSTALLED IN A VACUUM CHAMBER

This application claims priority from European Patent Application No: 04 007 325.6-1523 filed Mar. 26, 2004, herein incorporated by reference in its entirety.

BACKGROUND AND SUMMARY OF THE INVENTION

The invention relates to a method for operating vacuum installations under pressure changes between the operating pressure and the ambient pressure. The vacuum chamber of the vacuum installation has installed elements such as electronic components, transformers, motors, roller bearings and guide rollers provided with ventilatable coverings, i.e., coverings that can be ventilated. The guide rollers which are provided with roller bearings secured within the coverings on supporting bodies.

The change between the operating pressure, which most often is in the range of high-vacuum and specified by process conditions, and ambient pressure or atmospheric pressure occurs in particular when a substrate change, installing supplies of coating material, maintenance, repair or change-over is required. The pressure rise results from a process, also referred to as "flooding", before a closure device of the vacuum chamber is opened. However, flooding, which occurs through an appropriately dimensioned flooding valve, causes dust or other particles accumulated in the vacuum chamber to be swirled up and suspended in the chamber. The term "flooding" as used herein means that the previously evacuated vacuum chamber is being refilled with a gaseous medium, preferably air.

As a rule, numerous installed elements such as electronic components, transformers, motors, roller bearings and guide rollers, are disposed in the vacuum chamber. These are provided with ventilatable coverings, for example with housings, capsules or the like.

The guide rollers or their segments themselves may form coverings for the roller bearings disposed therein Webs guided by the guide rollers, such as paper, metal and synthetic films also form a type of "covering", which impedes and delays gas exchange.

As a rule the pressure rise in the coverings occurs, therefore, more slowly than in the relatively rapidly flooded vacuum chamber such that suspended particulates have a tendency to penetrate through openings, gaps, even through imperfect seals in the coverings, causing damage.

DE 27 25 331 C2 discloses lubricating the roller bearings of so-called expander rollers for a web transport within chambers with an oil mist pressure feed lubrication facility, two channels being disposed within the rollers curved in the form of an arc, for the inward and outward ducting of the oil mist, or the remaining air. However, the described method only operates properly if the expander roller is sealed with respect to the chamber, which is achieved either through an elastomeric sheathing of the rollers or by elastomeric adapters for rigid cylindrical roller segments. Flushing of the surroundings of the roller and the elimination of dust and other particles from the treatment process of the web is thereby not possible, especially not when during the flooding or, during the flooding of the installation with a flooding valve, dust and other particles are swirled up, which, while being in a state of suspension, have the tendency of penetrating into all nonsealed hollow spaces following the pressure rise due to the flooding.

DE 37 33 448 A1 discloses individually lubricating bilaterally sealed roller bearings of so-called expander rollers for a web transport through pressure lubrications with grease or oils, two channels being disposed within the roller curved in the form of an arc for the inward and outward ducting of the lubricants. However, adding air or another gas is not addressed, such that flushing the surroundings with gases is as little possible as is a gas flushing of the interior space of the roller or other components.

DE 39 19 425 C2 discloses periodically relubricating under control the grease charging of the individual roller bearings of curved, circumferentially closed expander rollers with base oil. However, mixing in air or another gas is not addressed, such that flushing of the surroundings with gases is not readily possible as is also not gas flushing of the interior space of the roller or other components.

The collective body of prior art dose not take into consideration the stirring up of dust or other particulate matter in a vacuum chamber during flooding with ambient air for the purpose of a web change under atmospheric pressure. The dust and other particles may have, for example, derived from a preceding coating process and which, due to the pressure rise during flooding, can penetrate into all coverings, housings or the like of the installed elements in the vacuum chamber and can significantly interfere with their function. This applies to the interior spaces of expander rollers with roller bearings as well as to the interior spaces of electric or electronic components. Especially hazardous is zinc dust, which is generated during the coating of films through the vaporization of zinc in the vacuum. Zinc condenses in the interior of the vacuum chamber on arbitrary surfaces and, together with the oxygen in the air, forms zinc oxide, and accumulation in roller bearings can lead to their wear-down.

In this connection it is especially necessary to take into consideration that, as a rule, expander rollers do not have a driving unit of their own but rather must be "dragged" by the film to be expanded. This has an especially negative effect with sensitive films in a thickness range of about 0.002 mm.

The goal of the invention is, therefore, to develop a method as described above so that all installed elements, enclosed in the vacuum chamber or installation and encompassed by an air-permeable covering or a housing, that covers or houses elements such as electronic components, transformers, motors, bearings and guide rollers which are protected against the penetration of suspended dust and other particles swirled up during the flooding from operating pressure (vacuum) to ambient pressure.

According to the invention this goal is attained in the above described method wherein before the vacuum chamber is flooded, a gas is introduced into the coverings so that the solid bodies such as dust and particles are blown out of the coverings e to prevent penetration of solid bodies into the covering.

The posed task is completely solved through these measures, i.e. all installed elements enclosed in the vacuum chamber or installation and encompassed by an air-permeable covering or a housing covering or housing elements such as electronic components, transformers, motors, bearings and guide rollers, are protected against the penetration of swirled up and suspended dust and other particles during the flooding from operating pressure (vacuum) to ambient pressure. The vacuum in the installed elements which, due to the gas throughflow, decreases more slowly, is a quasi cleaning means and a buffer against the penetration of foreign substances.

In the course of further implementations of the invention it is especially advantageous if, either singly or in combination the coverings are comprised of hollow rollers or roller segments, in which are located roller bearings with inner races and outer races and the gas is blown through the annular gap between the inner and the outer races, and/or if during the entire flooding process of the vacuum chamber the gas is ducted through said coverings.

In the following an embodiment example of the subject matter of the invention, its operational mechanism and its advantages will be explained in further detail in conjunction with FIGS. 1 and 2.

DETAILED DESCRIPTION

Figure 1:
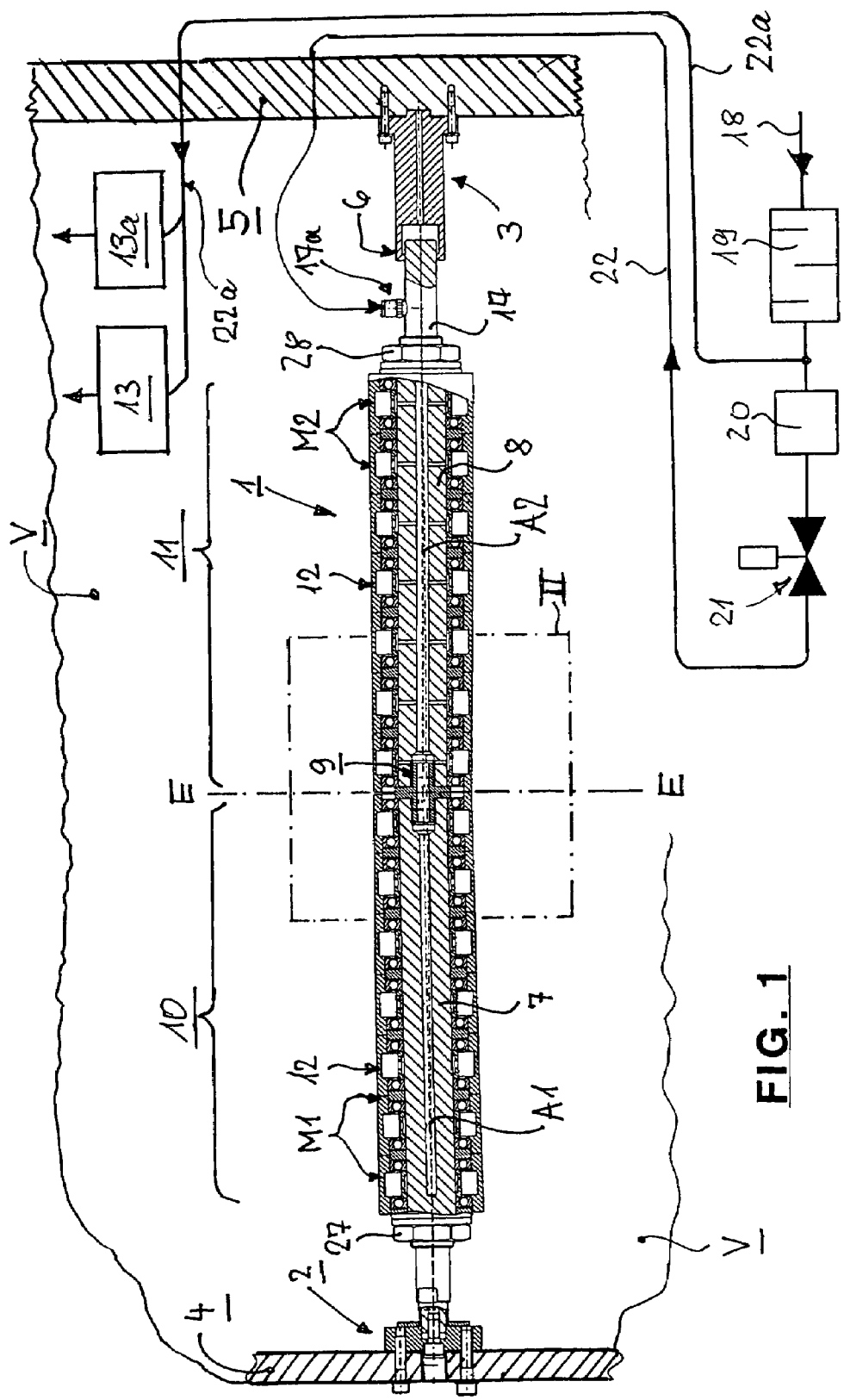
FIG. 1 is an axial section through an expander roller arrangement disposed between two side walls of a vacuum chamber.

FIG. 1 depicts an expander roller arrangement 1, which is retained by means of two mountings 2 and 3 on the insides of two parallel perpendicular chamber walls 4 and 5 of a vacuum chamber V, here only indicated. A position compensation, which may occur through temperature changes of the roller arrangement and/or pressure changes at the chamber walls 4 and 5, is compensated via a sliding guide 6.

The expander roller arrangement 1 includes two tubular supporting bodies 7 and 8, which at their ends remote from the wall are connected with one another in a center plane E—E by a coupling element 9 such that they are positionally secure. On these supporting bodies 7 and 8 are supported two groups 10 and 11, each group having seven roller segments 12 with rotationaly symmetric surfaces 12a, developed as circular truncated cone faces and steplessly arrayed in series with one another. The particular smaller circumferentail circles of the top surface in each group 10 or 11 are oriented toward the center plane E—E. The particular larger circumferential circles of the base surfaces are oriented in each group 10 or 11 toward the chamber walls 4 or respectively 5. The shell lines M1 and M2 which are uppermost in FIG. 1, are linearly aligned and form a common take-down line for a web, not shown here. This presupposes that the axes A1 and A2 of both groups 10 and 11 form an acute angle of, for example, 0.8 degrees.

Figure 2:
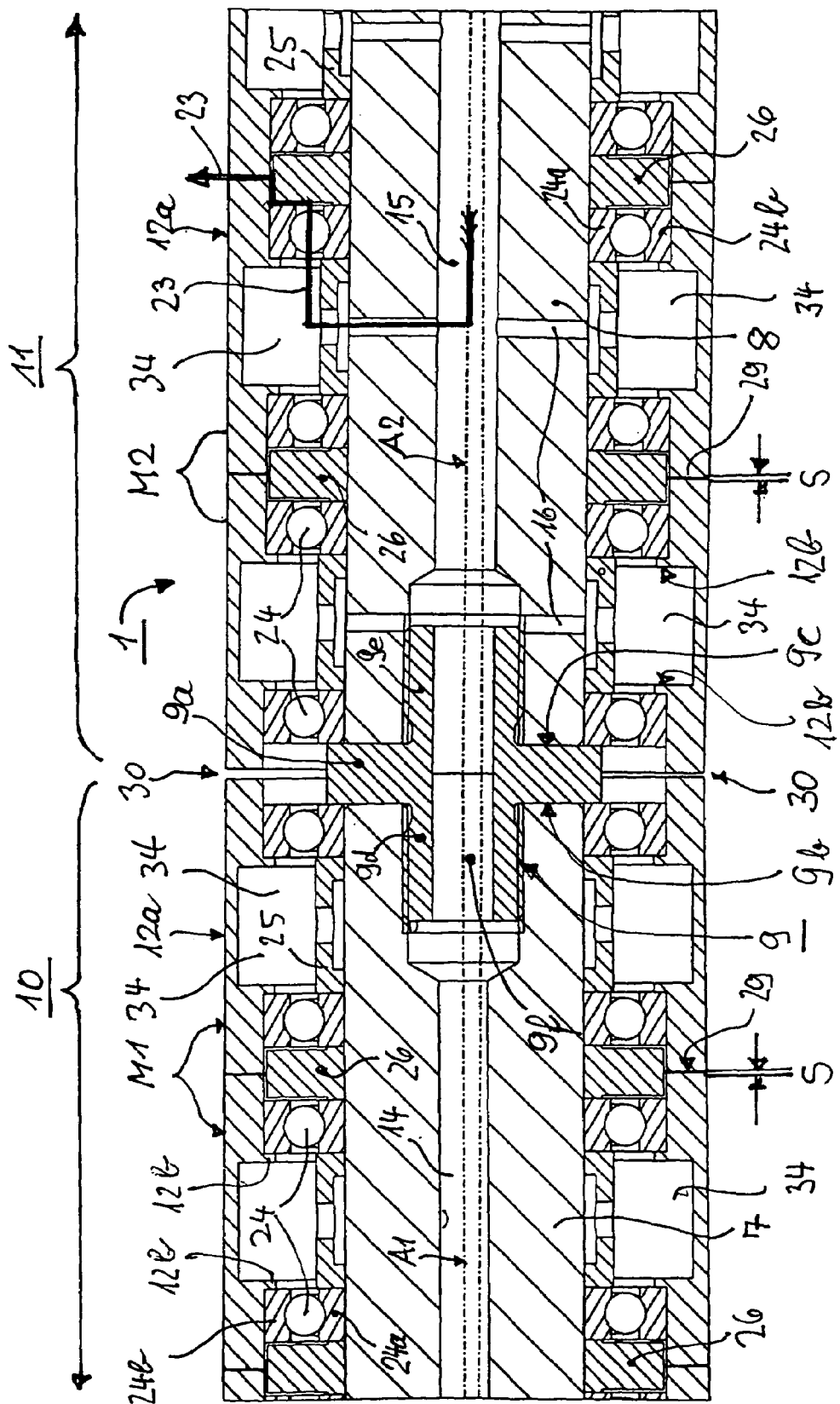
FIG. 2 is cutout from frame II in FIG. 1 at a highly enlarged scale.

The supporting bodies 7 and 8 have concentric longitudinal bores 14 or respectively 15, from which radial bores 16 lead to the individual roller bearings, which, although in FIG. 2 only shown in detail for the right group 11 of the roller segments 12, also applies to in the left group 10. The right longitudinal bore 15 leads to a tubular piece 17 which is also hollow, and which has a lateral connection element 17a. This can be explained in the following way:

If a web is to be changed, the vacuum chamber must be flooded to ambient pressure, which, for the purpose of saving time, is carried out through a flooding valve having a large cross section. Even if a dust filter is associated with this valve, the strong air current is nevertheless capable of swirling up dust which may have settled in any location. This dust also has a tendency to penetrate into the expander roller arrangement and to block its bearings, such that more frequent disassembling and cleaning of the expander roller arrangement is necessary. Especially hazardous is the formation of zinc dust occurring during the coating of webs with zinc. In the presence of oxygen this zinc dust forms zinc oxide, which becomes settled in the bearings as well as also in gaps and housings of installed elements.

This can be counteracted by the invention in the following manner: before the stand-down phase, i.e. before starting the venting and the opening of the vacuum chamber, small quantities of ambient air 18 are supplied via a filter 19, a lubricant source 20 (for example an oil nebulizer) and a setting or dosing valve 21 as well as a line 22 to the connection element 17a. These small quantities are just sufficient for the next web treatment cycle. One of these flow paths for the oil mist is indicated in FIG. 2 by a line 23. The pressure and the dosing are matched, such that at least the major portion of the oil remains in the roller bearings.

This has the additional advantage that the air, supplied to the expander roller arrangement during the flooding of the chamber, prevents the dust and other particles from penetrating into the expander roller arrangement. In the course of flooding the lubricant addition can also be interrupted or the lubricant source can be circumvented.

Behind filter 19 is connected a branch line 22a leading to two installed elements 13 and 13a within vacuum chamber V. Regulation of the air quantity can be carried out through a pump, not shown here, and/or through regulating valves, also not shown here, or with flow restrictors.

Applying the previous reference symbols, FIG. 2 shows the following: the coupling element 9 is comprised of an annular flange 9a with two flat side faces 9b and 9c, from each of which in the direction of the normal projects one threaded connection fitting 9d and 9e. The side faces 9b and 9c form the same acute angle of, for example, 0.8 degrees as the axes A1 and A2. Onto the treaded connection fittings 9d and 9e are screwed the tubular supporting bodies 7 and 8 up to the stop onto the side faces 9d and 9e. The assembly of coupling element 9 and supporting bodies 7 and 8 thereby form a positionally secure and flexurally resistant bearing unit for the two groups 10 and 11 of roller segments 12 and the linear alignment of the shell lines M1 and M2. The coupling element 9 has a through-bore 9f for the connection of the longitudinal bores 14 and 15.

A series arrangement of roller bearings 24 with inner races 24a and outer races 24b, perforated spacer rings 25 of small outer diameter and nonperforated spacer rings 26 of greater outer diameter are slid from both ends onto said assembly of coupling element 9 and supporting bodies 7 and 8, and tightened against one another by nuts 27 and 28 (FIG. 1). On two roller bearings 24 in each instance the roller segments 12 are supported on a bearing such that they are tight against displacement and specifically by inner flanges 12b, which are directed radially inwardly and which are laterally in contact on the outer races 24b of the roller bearings 24. Aside from the inner diameters of the spacer rings 26, their side walls are set back stepwise toward the outside and the outer diameter is less than that of the outer races 24b, such that on the outer circumference of the stationary spacer rings 26 no contact with adjacent rotating structural parts, in particular with the roller segments 12, is possible.

The axial dimensions are such that between the roller segments 12 annular gaps 29 with a gap width "s" of, for example 0.2 mm, are formed.

Relative rotational movements between the individual roller segments 12 are thereby made possible. With reference to oppositely disposed imaginary fixed points of the two immediately adjacent roller segments 12 of both groups 10 and 11 in the proximity of the coupling element 9, said fixed points move such that the width of a gap 30 in the proximity of the coupling element 9 fluctuates during the rotation, for example periodically, between 0.89 mm (in FIG. 2 below) and 1.53 mm (above). The linear alignment of shell lines M1 and M2 remains unchanged during the rotation of the roller segments. It is here important that through this bridge-like structuring the circumferential speed of the roller segments 12 in the proximity of their shell lines M1 and M2 is identical on both sides of the coupling element 9.

During operation the roller segments 12 of both groups 10 and 11 rotate absolutely at the same circumferentail speed due to the bridge formation of the assembly of coupling element 9 and supporting bodies 7 and 8, whereby slip and frictional movements of the web on the conical roller segments 12 in the cirucmferentail direction are reduced to a minimum. These local slip and friction movements decrease further with increasing number of roller segments 12 per unit length of the expander roller arrangement.

Through the series disposition of roller segments 12 and their roller bearings 24 and spacer rings 25 and 26, relative to the supporting bodies 7 and 8 one continuous interspace 34 is formed, which is blown free and kept free of particulates through the introduction of gas.

The invention claimed is:

1. A method comprising introducing a gas, prior to a flooding process of a vacuum chamber (V) of a vacuum installation, into coverings of elements installed in said vacuum chamber, which coverings can be ventilated such that solid bodies selected from the group consisting of dust and particles are blown out of said coverings thereby preventing a penetration of said solid bodies into the coverings, wherein said elements are selected from the group consisting of electronic components, transformers, motors, roller bearings and guide rollers, wherein the guide rollers are provided with roller bearings which are retained within the coverings on supporting bodies.

2. The method as claimed in claim 1, wherein the coverings comprise hollow rollers or roller segments in which are disposed roller bearings with inner races and outer races, and wherein the gas is blown through an annular gap between the rollers or roller segments and between the inner races and the outer races.

3. The method as claimed in claim 1, wherein the gas is ducted through the coverings during an entire flooding process of the vacuum chamber (V).

4. A method comprising:
   introducing a gas into a ventilatable covering in a vacuum chamber (V) of a vacuum installation that is under vacuum to blow a solid body out of the covering; wherein the ventilatable covering houses an installed element therein, and
   subsequently flooding the vacuum chamber with a gaseous medium.

5. The method of claim 4, wherein the installed element is selected from the group consisting of electronic components, transformers, motors, roller bearings and guide rollers.

6. The method of claim 5, wherein the guide rollers are provided with roller bearings.

7. The method of claim 5, wherein the roller bearings are retained within the coverings on supporting bodies.

8. The method of claim 4, wherein the coverings comprise hollow rollers or roller segments with roller bearings having an inner race and an outer race disposed therein.

9. The method of claim 8, wherein the gas is blown through an annular gap between the rollers or roller segments.

10. The method of claim 8, wherein the gas is blown between an inner race and the outer race.

11. The method as claimed in claim 4, wherein the gas is ducted through the coverings during the entire flooding process of the vacuum chamber (V).

12. The method of claim 4, wherein the solid body is selected from the group consisting of dust and particles.

13. The method of claim 4, wherein the solid body is dust.

* * * * *